Patented June 2, 1953

2,640,839

UNITED STATES PATENT OFFICE 2,640,839

$\Delta^{9(11)}$-PREGNENES AND PROCESS

Norman L. Wendler, Summit, and Robert P. Graber, Elizabeth, N. J., assignors to Merck & Co., Inc., Rahway, N. J., a corporation of New Jersey No Drawing. Application May 22, 1952, Serial No. 289,442

18 Claims. (Cl. 260—397.4)

This invention relates to the preparation of the new chemical compounds, $\Delta^{9(11)}$-pregnene-17-($\alpha$),21-diol-3,20-dione-21-acylates. It is also concerned with the preparation of the novel chemical compounds, $\Delta^{9(11),17}$-20-cyanopregnadiene-21-ol-3-one-21-acylates, produced as intermediates in our novel process.

The new chemical compounds with which our invention is concerned are useful intermediates in the synthesis of $\Delta^{4,9(11)}$-pregnadiene-17($\alpha$),21-diol-3,20-dione-21-acetate, also known as $\Delta^{9(11)}$-dehydro compound S acetate and 11(9)-anhydro compound F acetate, which compound possesses cortisone-like activity. (11(9)-anhydro compound F acetate has been tested for local activity by the cotton-pellet granuloma test. The results indicate a very high order of local activity for this compound.)

In preparing our novel chemical compounds we utilize as starting materials, $\Delta^{17}$-20-cyanopregnene-11($\beta$),21-diol-3-one-21-acylates. These compounds may be prepared by reducing the 3-diethyl ketal of 20-cyano-17-pregnene-21-ol-3,11-dione with lithium borohydride. After removal of the ketal grouping, 20-cyano-17-pregnene-11($\beta$),21-diol-3-one is recovered and acylated. This procedure for recovering $\Delta^{17}$-20-cyanopregnene-11($\beta$),21-diol-3-one-21-acetate is fully described in the Journal of the American Chemical Society, vol. 72, page 5793 (1950). Other $\Delta^{17}$-20-cyanopregnene-11($\beta$),21-diol-3-one-21-acylates may also be used.

The starting compound, $\Delta^{17}$-20-cyanopregnene-11($\beta$),21-diol-3-one-21-acylate, has the structural formula:

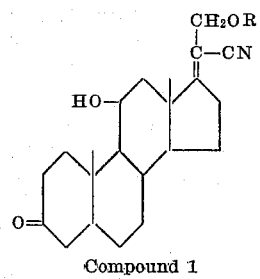

Compound 1 wherein R is an acyl group.

In accordance with our process the above compound, $\Delta^{17}$-20-cyanopregnene-11($\beta$),21-diol-3-one-21-acylate, is treated with a dehydrating agent to form $\Delta^{9(11),17}$-20-cyanopregnadiene-21-ol-3-one-acylate, which may be identified by the following formula:

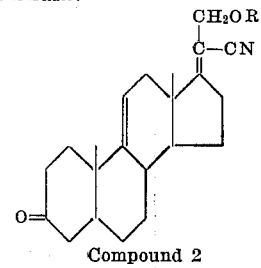

Compound 2 wherein R is as above.

The $\Delta^{9(11),17}$-20-cyanopregnadiene-21-ol-3-one-acylate is then reacted with osmium tetroxide, which results in the formation of 17,20-osmate ester of $\Delta^{9(11)}$-20-cyanopregnene-17($\alpha$),20,21-trihydroxy-3-one-21-acylate, a compound having the following structural formula:

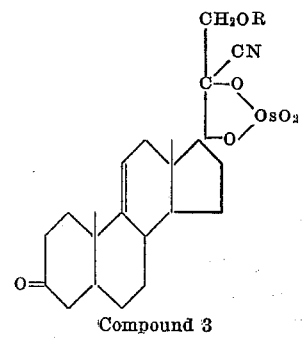

Compound 3 wherein R is as above.

In accordance with our process the above compound is reacted with a hydrolyzing agent to yield $\Delta^{9(11)}$-pregnene-17($\alpha$),21-diol-3,20-dione-21-acylate, which has the structural formula:

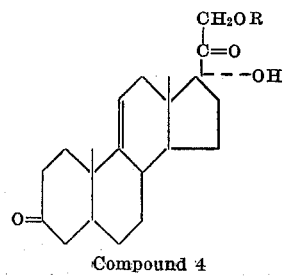

Compound 4 wherein R is as above.

The $\Delta^{9(11)}$-pregnene-17($\alpha$),21-diol-3,20-dione-21-acylate may be reacted with bromine to form 4 - bromo - $\Delta^{9(11)}$ - pregnene - 17($\alpha$),21 - diol-3,20-dione-21-acylate, and the latter compound reacted with a dehydrohalogenating agent to form $\Delta^{4,9(11)}$ - pregnadiene - 17($\alpha$),21 - diol - 3,20-dione-21-acylate. This general procedure for obtaining $\Delta^{4,9(11)}$-pregnadiene-17($\alpha$),21-diol-3,20-dione-21-acylate is fully described and claimed in a copending application of Norman L. Wendler, Robert P. Graber and Alfred C. Haven, Jr., Serial No. 289,441, filed May 22, 1952.

$\Delta^{4,9(11)}$ - pregnadiene -17($\alpha$),21-diol-3,20-dione-21-acetate was tested for local tissue activity by the method of Meier, Schuler and Desaulles (Experientia, 6, 469, 1950). This technique consists of implantation of cotton pellets subcutaneously in rats. This stimulates the growth of granuloma tissue which can be inhibited by cortisone. In these tests, two pellets were placed in each rat, one on each side of the abdomen, the one on the right side being soaked with 0.1 ml. of suspending medium containing 0.5 mgm. of the steroid $\Delta^{4,9(11)}$-pregnadiene-17($\alpha$),21-diol-3,20-dione-21-acetate; and the one on the left soaked with 0.1 ml. of suspending medium only. The pellets were left in place in the animals for six days. They were then dissected out and dried to constant weight. The following results were obtained:

| | Increment in dry weight | | Percent inhibition |
|---|---|---|---|
| | Control Pellet | Steroid Pellet | |
| First test | 30.3 | 17.0 | 43.9 |
| Second test | 41.2 | 18.2 | 55.8 |

This indicates a very high order of local activity. "Per cent inhibition" is calculated as follows:

$$\frac{a-b}{a} \times 100 = \text{percent inhibition}$$

where $a$=increment in dry weight of control pellet
$b$=increment in dry weight of steroid pellet The dehydration at the 9:11 position of $\Delta^{17}$-20 - cyanopregnene - 11($\beta$),21 - diol - 3 - one - 21-acetate (compound 1) may be conveniently carried out with suitable reagents which include phosphorus oxychloride, a mixture of a lower aliphatic carboxylic acid and hydrochloric acid, or a mixture of boron fluoride and a lower aliphatic carboxylic acid.

Dehydration employing phosphorus oxychloride is carried out by treating a solution of $\Delta^{17}$-20-cyanopregnene-11($\beta$),21-diol-3 - one - 21-acetate with an excess of the reagent, in the presence of a solvent. Suitable solvents include the general class of proton accepting organic compounds such as pyridine, quinoline, triethylamine, dimethyl aniline. Also, a mixture of an inert organic solvent such as benzene or toluene and one of the basic non-aqueous reagents may be employed. The reaction time varies with the temperature of the reaction mixture from about 6 hours at about 40° C. to more than 72 hours at room temperature or lower. In the preferred process we employ $\Delta^{17}$-20-cyanopregnene-11($\beta$),-21-diol-3-one-21-acetate and phosphorus oxychloride in the presence of pyridine for 72 hours at room temperature. Under these conditions, the reaction is substantially complete after about 24 hours but by allowing the reaction time to extend to a total of about 72 hours, a slightly greater yield is realized.

The dehydration of $\Delta^{17}$-20-cyanopregnene-11-($\beta$),21-diol-3-one-21-acetate with a mixture of hydrochloric acid and a lower aliphatic carboxylic acid requires more vigorous conditions. The $\Delta^{17}$-20-cyanopregnene-11($\beta$),21-diol-3-one-21-acetate is added to a mixture of hydrochloric acid and a lower aliphatic carboxylic acid, preferably acetic acid, and the mixture is heated to the reflux temperature for about one-half to one and one-half hours. We have found it preferable to use a ratio of one part concentrated hydrochloric acid to four parts glacial acetic acid.

This acid dehydration of $\Delta^{17}$-20-cyanopregnene-11($\beta$),21-diol-3-one-21-acetate can be carried out by using other strong non-oxidative or non-reductive acids such as oxalic acid, para-toluene sulfonic acid, sulfuric acid, hydrobromic acid and phosphoric acid.

The product recovered from the dehydration procedure, $\Delta^{9(11),17}$-20-cyanopregnadiene-21-ol-3-one-acetate (compound 2), may then be extracted from the resulting reaction mixture with a water immiscible solvent such as benzene, toluene, chloroform or carbon tetrachloride and, if necessary, purified by chromatography.

The $\Delta^{9(11),17}$-20-cyanopregnadiene-21-ol-3-one-acetate is then treated with osmium tetroxide, preferably in the presence of a tertiary organic amine such as pyridine. The 17,20-osmate ester of $\Delta^{9(11)}$-20-cyanopregnene - 17($\alpha$),20,21 - trihydroxy - 3 - one - 21 - acetate (compound 3) thus formed is not necessarily isolated but reacted directly with a hydrolyzing agent. The hydrolysis may be carried out utilizing either an aqueous alkaline solution containing a reducing agent such as sodium sulfite or an aqueous solution of a mineral acid such as hydrochloric acid. We prefer to use a mineral acid for this hydrolysis; however, this acid hydrolysis must be followed by a mild alkaline treatment such as aqueous bicarbonate. (This additional treatment is required to convert any cyanohydrin, which may have been formed, to the desired $\Delta^{9(11)}$-pregnene-17($\alpha$),21-diol-3,20-dione-21-acetate.) This reaction mixture is extracted with an organic solvent such as chloroform or benzene. The organic solvent extract is then evaporated to dryness to produce the $\Delta^{9(11)}$-pregnene-17($\alpha$),21-diol-3,20-dione-21-acetate (compound 4).

The following examples illustrate methods of carrying out the present invention, but it is to be understood that these examples are given primarily by way of illustration and not of limitation.

EXAMPLE 1

*Procedure for the preparation of $\Delta^{9(11),17}$-20-cyanopregnadiene - 21 - ol - 3 - one - acetate (compound 2)*

The starting material employed in our process, $\Delta^{17}$-20-cyanopregnene-11($\beta$),21-diol-3-one-21-acetate (compound 1), was prepared by reducing the 3-diethyl ketal of 20-cyano-17-pregnene-21-ol-3 with lithium borohydride, removing the ketal grouping and acetylating. This procedure for the preparation of $\Delta^{17}$-20-cyano-pregnene-11($\beta$),21-diol-3-one-21-acetate is fully described in the Journal of the American Chemical Society, vol. 72, page 5793 (1950).

2.00 grams of $\Delta^{17}$-20-cyanopregnene-11($\beta$),21-diol-3-one-21-acetate thus prepared was dissolved in 10 ml. of pyridine containing one drop of water. To this solution was added 1.0 ml. of phosphorus oxychloride and the reaction mixture was allowed to stand at room temperature for three days. Water was added and the resulting solution was extracted three times with chloroform. The combined extracts were washed with 2.5N hydrochloric acid until free of pyridine, and then with water. The residue obtained on concentration was chromatographed over acid-washed alumina from benzene solution and eluted with benzene. The benzene eluates were concentrated to dryness. The fractions giving crystalline residues melting in the range 120–129° C. were combined and recrystallized from a mixture of ethyl acetate and petroleum ether, to yield $\Delta^{9(11),17}$ - 20 - cyanopregnadiene - 21 - ol - 3 - one-acetate (compound 2), having a melting point of 124.5–126° C. (identified by melting point and mixed melting point with the material prepared by the alternative procedure below).

*Alternative procedure for the preparation of $\Delta^{9(11),17}$ - 20 - cyanopregnadiene - 21 - ol - 3 - one-acetate (compound 2)*

2.00 grams of $\Delta^{17}$-20-cyanopregnene-11($\beta$),21-diol-3-one-21-acetate (compound 1), was dissolved in 25 ml. of a 1:4 mixture of concentrated hydrochloric acid and glacial acetic acid and heated under reflux for twenty minutes. An additional 13 ml. of the 1:4 acid mixture was then added and the solution refluxed for an additional 65 minutes. The resulting solution was concentrated to dryness in vacuo. Water was added and the mixture was extracted with ether. The combined extracts were washed with 5% sodium bicarbonate followed by a saturated solution of sodium chloride. The residue obtained on concentration was chromatographed over acid-washed alumina from a 1:1 benzene-petroleum ether solution. The crystalline residues melting from 120–129° C. which were obtained from the benzene and benzene-ether eluates were combined and crystallized from petroleum ether to yield $\Delta^{9(11),17}$ - 20 - cyanopregnadiene - 21 - ol - 3-one-acetate (compound 2), having a melting point of 124–128° C. A sample prepared for analysis by recrystallization from ether-petroleum ether (boiling point 30–60°) was obtained as rosettes of heavy needles, melting point 127–129°, $\lambda_{max.}^{CH_3OH}$ 2220 Å., $E_{1\ cm.}^{1\%}$ 413, $[\alpha]_D^{25} +60.5°$ (0.94 acetone)

Analysis calculated for $C_{24}H_{31}O_3N$: C, 75.56; H, 8.19. Found C, 75.51; H, 8.20.

EXAMPLE 2

*Preparation of $\Delta^{9(11)}$-pregnene-17($\alpha$),21-diol-3,20-dione-21-acetate (compound 4)*

2.13 grams of $\Delta^{9(11),17}$-20-cyanopregnadiene-21-ol-3-one-acetate (compound 2) was oxidized with 1.43 g. of osmium tetroxide in 17.5 ml. of dry benzene and 3.5 ml. of dry pyridine. The reaction mixture was allowed to stand at room temperature for one day. To the mixture was added 25 ml. of chloroform and 0.71 g. of a diatomaceous earth filter aid and the resulting suspension treated dropwise with stirring with 7.0 ml. of concentrated hydrochloric acid. The suspension was allowed to stir at room temperature for two hours. It was then filtered and the cake was well washed with hot chloroform. The combined filtrates were washed twice with water and then stirred for one and one-half hours with 100 ml. of 5% aqueous potassium carbonate.

The chloroform layer was separated, washed twice with water and concentrated to dryness. The residue was dissolved in 15 ml. of chloroform and 2 ml. of dry pyridine and treated with 2 ml. of acetic anhydride overnight at room temperature. The reaction mixture was poured into water and extracted three times with chloroform. The combined extracts were washed with water, concentrated and crystallized from a mixture of chloroform and ether. The product melted at 201–205° C. Several recrystallizations from ethyl acetate resulted in $\Delta^{9,11}$-pregnene-17($\alpha$),21-diol-3,20-dione-21-acetate (compound 4), having a constant melting point of 204–206° C.

Analysis calculated for $C_{23}H_{32}O_5$: C, 71.10; H, 8.30. Found: C, 71.33; H, 8.01.

Modifications may be made in carrying out the present invention without departing from the spirit and scope thereof and the invention is to be limited only by the appended claims.

We claim:

1. $\Delta^{9(11),17}$ - 20 - cyanopregnadiene - 21 - ol - 3 - one - acylate.

2. $\Delta^{9(11),17}$ - 20 - cyanopregnadiene - 21 - ol - 3-one-acetate.

3. 17,20 - osmate ester of $\Delta^{9(11)}$ - 20 - cyanopregnene - 17 ($\alpha$),20,21 - trihydroxy - 3 - one-21-acylate.

4. 17,20 - osmate ester of $\Delta^{9(11)}$ - 20 - cyanopregnene - 17 ($\alpha$),20,21 - trihydroxy - 3 - one-21-acetate.

5. $\Delta^{9(11)}$ - pregnene - 17($\alpha$),21 - diol - 3,20-dione-21-acylate.

6. $\Delta^{9(11)}$ - pregnene - 17 ($\alpha$),21 - diol - 3,20-dione-21-acetate.

7. The process that comprises reacting $\Delta^{17}$-20-cyanopregnene - 11($\beta$),21 - diol - 3 - one - 21-acylate with a dehydrating agent to form $\Delta^{9(11),17}$ - 20 - cyanopregnadiene - 21 - ol - 3-one-acylate, reacting the latter compound with osmium tetroxide to form the 17,20 - osmate ester of $\Delta^{9(11)}$ - 20 - cyanopregnene - 17 ($\alpha$),20,21-trihydroxy - 3 - one - 21 - acylate, and hydrolyzing the latter compound to form $\Delta^{9(11)}$-pregnene - 17($\alpha$),21 - diol - 3,20 - dione - 21-acylate.

8. The process that comprises reacting $\Delta^{17}$-20 - cyanopregnene - 11 ($\beta$),21 - diol - 3 - one-21 - acetate with a dehydrating agent to form $\Delta^{9(11),17}$ - 20 - cyanopregnadiene - 21 - ol - 3-one - acetate, reacting the latter compound with osmium tetroxide to form the 17,20-osmate ester of $\Delta^{9(11)}$ - 20 - cyanopregnene - 17($\alpha$),20,21-trihydroxy - 3 - one - 21 - acetate, and hydrolyzing the latter compound to form $\Delta^{9(11)}$-pregnene - 17($\alpha$),21 - diol - 3,20 - dione - 21-acetate.

9. The process that comprises reacting $\Delta^{17}$-20-cyanopregnene - 11($\beta$),21 - diol - 3 - one - 21-acetate with phosphorus oxychloride in the presence of a proton accepting organic compound to form $\Delta^{9(11),17}$ - 20 - cyanopregnadiene-21 - ol - 3 - one - acetate, reacting the latter compound with osmium tetroxide to form the 17,20 - osmate ester of $\Delta^{9(11)}$ - 20 - cyanopregnene - 17($\alpha$),20,21 - trihydroxy - 3 - one - 21-acetate, and hydrolyzing the latter compound to form $\Delta^{9(11)}$ - pregnene - 17($\alpha$),21 - diol - 3,20-dione - 21 - acetate.

10. The process that comprises reacting $\Delta^{17}$-20 - cyanopregnene - 11($\beta$),21 - diol - 3 - one-21 - acetate with a mixture of a lower aliphatic carboxylic acid and hydrochloric acid to form $\Delta^{9(11),17}$ - cyanopregnadiene - 21 - ol - 3 - one-acetate, reacting the latter compound with osmium tetroxide to form the 17,20 - osmate ester of $\Delta^{9(11)}$ - 20 - cyanopregnene - 17($\alpha$),20,21-trihydroxy - 3 - one - 21 - acetate, and hydrolyzing the latter compound to form $\Delta^{9(11)}$-pregnene - 17($\alpha$),21 - diol - 3,20 - dione - 21-acetate.

11. The process that comprises reacting $\Delta^{17}$-20 - cyanopregnene - 11($\beta$),21 - diol - 3 - one-21 - acetate with a mixture of boron fluoride and a lower aliphatic carboxylic acid to form $\Delta^{9(11),17}$ - 20 - cyanopregnadiene - 21 - ol - 3-one - acetate, reacting the latter compound with osmium tetroxide to form the 17,20 - osmate ester of $\Delta^{9(11)}$ - 20 - cyanopregnene - 17($\alpha$),20,21-trihydroxy - 3 - one - 21 - acetate, and hydrolyzing the latter compound to form $\Delta^{9(11)}$-pregnene - 17($\alpha$),21 - diol - 3,20 - dione - 21-acetate.

12. The process that comprises reacting $\Delta^{17}$-20 - cyanopregnene - 11($\beta$),21 - diol - 3 - one-21 - acetate with a dehydrating agent to form $\Delta^{9(11),17}$ - 20 - cyanopregnadiene - 21 - ol - 3-one-acetate.

13. The process that comprises reacting $\Delta^{17}$-20 - cyanopregnene - 11($\beta$),21 - diol - 3 - one-21 - acetate with phosphorus oxychloride in the presence of a proton accepting organic compound to form $\Delta^{9(11),17}$ - 20 - cyanopregnadiene-21 - ol - 3 - one - acetate.

14. The process that comprises reacting $\Delta^{17}$-20 - cyanopregnene - 11($\beta$),21 - diol - 3 - one-21 - acetate with a mixture of a lower aliphatic carboxylic acid and hydrochloric acid to form $\Delta^{9(11),17}$ - 20 - cyanopregnadiene - 21 - ol - 3-one-acetate.

15. The process that comprises reacting $\Delta^{17}$-20 - cyanopregnene - 11($\beta$),21 - diol - 3 - one-21 - acetate with a mixture of boron fluoride and a lower aliphatic carboxylic acid to form $\Delta^{9(11),17}$ - 20 - cyanopregnadiene - 21 - ol - 3-one-acetate.

16. The process that comprises reacting $\Delta^{9(11),17}$ - 20 - cyanopregnadiene - 21 - ol - 3-one-acetate with osmium tetroxide to form the 17,20 - osmate ester of $\Delta^{9(11)}$ - 20 - cyanopregnene - 17($\alpha$),20,21 - trihydroxy - 3 - one - 21-acetate.

17. The process that comprises hydrolyzing the 17,20 - osmate ester of $\Delta^{9(11)}$ - 20 - cyanopregnene - 17($\alpha$),20,21 - trihydroxy - 3 - one-21 - acetate to form $\Delta^{9(11)}$ - pregnene - 17($\alpha$),21-diol - 3,20 - dione - 21 - acetate.

18. The process that comprises reacting $\Delta^{17}$-20 - cyanopregnene - 11($\beta$),21 - diol - 3 - one-21 - acylate with a dehydrating agent to form $\Delta^{9(11),17}$ - 20 - cyanopregnadiene - 21 - ol - 3-one-acylate.

NORMAN L. WENDLER.
ROBERT P. GRABER.

No references cited.